Figures 1, 2:
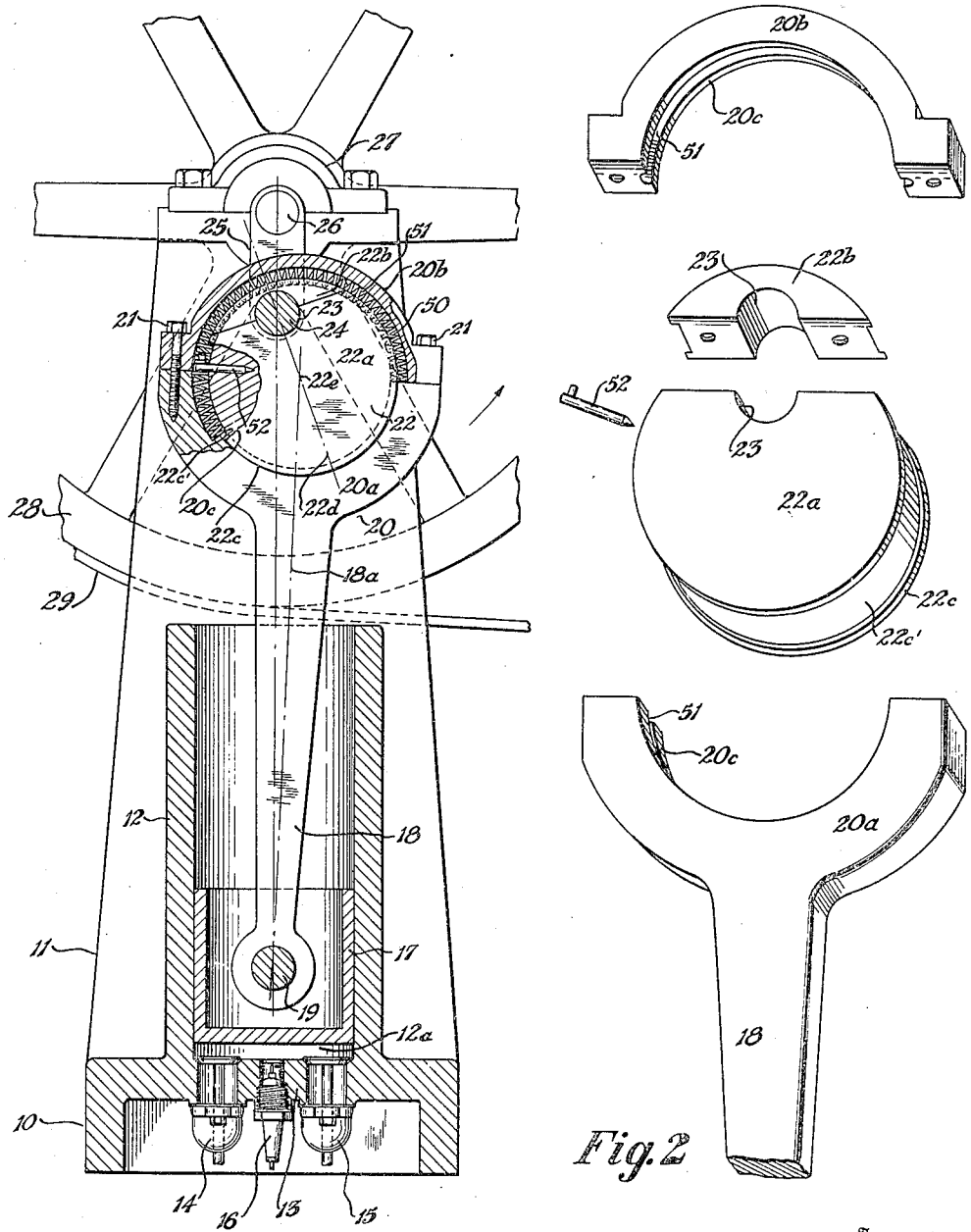

Aug. 30, 1932.   R. W. RIDER   1,875,180
MEANS FOR CONVERTING MOTION AND THE LIKE
Filed July 8, 1930

Inventor
Rowland W. Rider
By
Attorneys

Patented Aug. 30, 1932

1,875,180

UNITED STATES PATENT OFFICE

ROWLAND W. RIDER, OF SALT LAKE CITY, UTAH, ASSIGNOR TO UTAH ROYALTY CORPORATION, OF SALT LAKE CITY, UTAH, A CORPORATION OF UTAH

MEANS FOR CONVERTING MOTION AND THE LIKE

Application filed July 8, 1930. Serial No. 466,600.

My invention relates to means or mechanisms for converting motion in one predetermined path to motion in another predetermined path, and the like, and is a continuation of my prior application for patent filed March 9, 1929, Serial No. 345,702.

Means and mechanisms for converting motion in one predetermined path to motion in another predetermined path, may include one member constrained to move in a predetermined path which may be, for example, a crank pin mounted upon the end of a crank which is secured for rotation on a suitably journalled shaft, and the crank pin thus being movable in a predetermined circular path by rotation of the crank.

The crank pin, for example, may be pivotally connected to one end of a connecting rod, and the other end of the connecting rod may be pivotally connected to another member which is constrained to move in another predetermined path, as for example, a rectilinearly reciprocating member which may be a piston or hammer member slidable back and forth in a cylindrical guide member.

On the other hand, the other member may be a crank pin secured at the outer end of an oscillating lever arm mounted on a suitably journalled shaft, and the lever arm crank pin being pivotally connected to the connecting rod.

Either one of the members constrained to move in their respective predetermined paths may be a drive member, in which case the other member becomes a driven member.

In an internal combustion engine, for example, a rectilinearly reciprocating piston is connected by its connecting rod to a crank, which is rotated by the rectilinear movement applied to the piston by the expanding gases in the cylinder.

On the other hand, in the case of a hammer, power may be applied to the rotating crank which then becomes a driving member, and the reciprocating member becomes a driven member whose energy may be utilized for hammering, tamping, ramming, or crushing and the like.

In either case, due to the instantaneous change in direction of the motion of the reciprocating or oscillating member, at the end of each stroke thereof, and to the change in the velocity thereof from a maximum at the middle point of each stroke to zero at the end thereof, as ordinarily constructed, the other member of such a mechanism which may be, for example, the rotating crank and crank pin, as aforesaid, is subject to excessive stresses caused, first, by the necessity of absorbing the inertia forces of the reciprocating or oscillating member, and second, by the absorption of any forces externally applied thereto, as for example, the impact force applied to the piston of a hammer or crusher when it strikes the object being worked on, or in the case of an internal combustion engine, the maximum compression resistance, and the explosive force of the burning gases.

The objects of the present improvements include the provision of novel means including novel cushioning members for converting motion and the like, and adapted to overcome the foregoing and other objectionable features of the usual uncushioned means for converting motion.

The present invention includes the use of a cushioning member rotatably mounted preferably for free rotation on one of the members constrained to move in a predetermined path and preferably upon the rotating member, and the end of the connecting rod adjacent the rotating member being pivotally connected with the cushioning member instead of being connected directly to the rotating member.

The present invention further includes particular relationships between the dimensions of all the parts of the mechanism, and of the masses of the moving parts thereof, and between such elements and the maximum inertia and resisting forces set up in or applied to the reciprocating or oscillating member.

The present invention further includes the provision of yielding means for normally maintaining the cushioning member at any desired position relative to other parts of the apparatus, for obtaining improved operation of the apparatus.

By the use of the present invention, for example, it has been found possible to construct crushers and the like which may be directly driven by electric motors and the like, of relatively small horse power.

The foregoing and other objects are attained by the apparatus, parts, improvements, and combinations, which comprise the present invention, and which are particularly and distinctly pointed out and set forth in the appended claims forming part hereof.

A preferred embodiment of the invention is illustrated in the accompanying drawing forming part hereof, in which Figure 1 is a fragmentary view illustrating an internal combustion engine including the present improvements; and Fig. 2, a separated view of the eccentric cushioning member and enclosing member of the engine illustrated in Fig. 1.

Similar numerals refer to similar parts throughout the drawing.

An internal combustion engine embodying the present improvements is indicated generally at 10, and includes in combination with other usual parts of an internal combustion engine, a frame 11 at the lower end of which a cylinder 12 is mounted. The cylinder 12 is closed at its lower end by a cylinder head 13 in which suitable exhaust and inlet valves 14 and 15 and a spark plug 16 are operatively mounted.

The cylinder 12 extends vertically upwards from the cylinder head 13, and within the cylinder 12 a piston 17 is operatively mounted, and the piston 17 is thus a rectilinearly reciprocating member which is caused to be moved up and down within the cylinder 12 by the usual cycle of operations of the engine.

The rectilinear motion of the piston 17 is converted to circular motion through a connecting rod 18, the lower end of which is pivotally secured to the piston 17 as by means of a wrist pin 19, and the upper end of the connecting rod 18 is connected with an enclosing member indicated generally at 20 and which as illustrated includes one semi-circular portion 20a and another semi-circular portion 20b, the ends of which are secured to each other as by means of screws 21.

The enclosing member 20 may be however made of one piece.

Within the enclosing member 20 is rotatably mounted a circular eccentric cushioning member indicated generally by 22.

The cushioning member 22 as illustrated is formed by a larger segmental portion 22a and a smaller segmental portion 22b, which are secured together by suitable screws, but the cushioning member 22 may be formed of one piece of material.

The outer cylindric face 22c of the cushioning member has preferably formed therein a peripheral groove 22c' within which the inner cylindric face 20c of the enclosing member rotatably fits.

Preferably between the portions 22a and 22b of the cushioning member, a cylindric crank pin bearing 23 is formed, within which a crank pin 24 is mounted for free rotation.

The crank pin 24 is mounted upon the outer end of a crank 25, and the crank 25 is secured for rotation on a shaft 26.

The shaft 26 is journalled in a bearing block 27, and the bearing block 27 is carried at the upper end of the engine frame 11.

A power take-off fly wheel 28 is secured to the shaft 26 and power may be delivered therefrom as by means of a belt 29.

The crank pin 24 is thus constrained for movement in a circular path determined by the location of the axis of the crank pin 24 with respect to the axis of the shaft 26, and the force necessary for moving the crank pin is supplied by the usual gas explosions in the combustion chamber 12a of the cylinder 12.

The combustion chamber 12a is of relatively small volume and the engine 10 is a high compression engine, and the normal operating speed of the engine is relatively high, so as to maintain the heavier portion 22a of the cushioning member 22 always on the outside of the circular path of movement of the axis of the crank pin 24, whereby when explosion occurs, the cushioning member will be rotated slightly about the crank pin 24, thereby cushioning the force of the explosion and preventing detonation which would otherwise occur in the small combustion chamber.

The median line 22d of the cushioning member 22 has the geometrical center 22e of the cushioning member located thereon, and the longitudinal center line 18a of the connecting rod 18 always passes through the geometrical center 22e of the cushioning member.

In order to improve the operation of the engine 10, it is desirable to maintain the median line 22d of the cushioning member out of line or angular to the longitudinal center line 18a of the connecting rod 18, whereby the center line of the connecting rod at the time of explosion does not pass through the center line of the wrist pin, thereby improving the cushioning effect and causing the cushioning member to rotate about the crank pin 24 in the direction of the arrow 30.

Yielding means are preferably provided for so maintaining the parts in the aforesaid desired relationship, and may include a compression spring 50, which is preferably located in a segmental peripheral groove 51 formed in the inner face of the enclosing member 20, and a pin 52 is inserted in the cushioning member 22 and the head of the pin 52 engages with the spring 50.

The ends of the segmental peripheral grooves 51 maintain the spring 50 at the desired position with respect to the enclosing member 20, and the location of the pin 52 maintains the cushioning member 22 in any desired predetermined position relative to the enclosing member 20, and thus yieldingly maintains the median line of the cushioning member 22 at any desired position.

I claim:—

1. Means for connecting a driving rotary member having a wrist pin thereon with a reciprocating member below, the connecting means including an eccentric freely rotatable on the wrist pin of the rotary member, a member enclosing the eccentric and connected to the reciprocating member, the eccentric and enclosing member being adapted to rotate relatively, and yielding means between the eccentric and enclosing member adapted to maintain them in such positions relative to each other that a line drawn through the centre of the eccentric and the centre of its pivot will be normally in a predetermined angular relation to the centre line of the reciprocating member.

2. Means for connecting a driven crank shaft having a wrist pin thereon with a reciprocating member below it, the connecting means including an eccentric freely rotatable on the wrist pin of the crank shaft, a member enclosing the eccentric and connected to the reciprocating member, the eccentric and enclosing member being adapted to rotate relative to each other, and yielding means between the eccentric and enclosing member adapted to maintain them in such positions relative to each other that a line drawn through the centre of the eccentric and the centre of its pivot will be normally in a predetermined angular relation to the centre line of the reciprocating member.

3. Means for connecting a rotary member having a wrist pin thereon with a reciprocating member, the connecting means including an eccentric freely rotatable on the wrist pin of the rotary member, a member enclosing the eccentric and connected to the reciprocating member, the eccentric and enclosing member being adapted to rotate relative to each other, and yielding means between the eccentric and enclosing member adapted to maintain them normally in predetermined positions relative to each other, the yielding means including a pin on the eccentric and a spring carried on the enclosing member, and the pin and the spring being engaged with each other.

4. Means for connecting a crank shaft having a wrist pin with a reciprocating member, the connecting means including an eccentric freely rotatable on the wrist pin, the eccentric having a peripheral groove formed therein, a member enclosing the eccentric and extending into said groove and connected to the reciprocating member, the eccentric and enclosing member being adapted to rotate relative to each other, and yielding means between the eccentric and enclosing member adapted to maintain them normally in predetermined positions relative to each other, the yielding means including a pin on the eccentric and a spring on the enclosing member, and the pin and the spring being engaged with each other.

5. Means for connecting a rotary member having a wrist pin thereon with a reciprocating member, the connecting means including an eccentric freely rotatable on the wrist pin of the rotary member, the eccentric having a peripheral groove formed therein, a member enclosing the eccentric and extending into the eccentric groove and connected to the reciprocating member, the enclosing member having a groove formed in its inner face, the eccentric and enclosing member being adapted to rotate relative to each other, and yielding means between the eccentric and enclosing member adapted to maintain them normally in predetermined positions relative to each other, the yielding means including a pin on the eccentric and a spring on the enclosing member located in the groove formed in its inner face, and the pin extending into the enclosing member groove and engaging with the spring.

In testimony that I claim the above, I have hereunto subscribed my name.

ROWLAND W. RIDER.